US012504388B2

(12) United States Patent
Sakurai

(10) Patent No.: US 12,504,388 B2
(45) Date of Patent: Dec. 23, 2025

(54) CELL ASSEMBLY FOR ELECTRODE STRUCTURAL OBSERVATION

(71) Applicant: HONDA MOTOR CO., LTD., Tokyo (JP)

(72) Inventor: Atsushi Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 18/415,671

(22) Filed: Jan. 18, 2024

(65) Prior Publication Data
US 2024/0264097 A1    Aug. 8, 2024

(30) Foreign Application Priority Data
Feb. 8, 2023   (JP) ................. 2023-017502

(51) Int. Cl.
*H01M 10/42*   (2006.01)
*G01N 23/046*  (2018.01)
*G01N 23/083*  (2018.01)

(52) U.S. Cl.
CPC ......... *G01N 23/046* (2013.01); *G01N 23/083* (2013.01); *H01M 10/4285* (2013.01); *G01N 2223/1016* (2013.01); *G01N 2223/307* (2013.01); *G01N 2223/309* (2013.01); *G01N 2223/3306* (2013.01)

(58) Field of Classification Search
CPC .............. G01N 23/046; G01N 23/083; G01N 2223/1016; G01N 2223/307; G01N 2223/309; G01N 2223/3306; H01M 10/4285; B25B 11/00
See application file for complete search history.

(56) References Cited

U.S. PATENT DOCUMENTS

2021/0234207 A1   7/2021  Chae et al.
2021/0328273 A1*  10/2021 Jung ..................... H01M 4/505

FOREIGN PATENT DOCUMENTS

| JP | H0982295    A | 3/1997 |
| JP | 2012159311  A | 8/2012 |
| JP | 2019045295  A | 3/2019 |
| KR | 20210097013 A | 8/2021 |

OTHER PUBLICATIONS

Notification of Reasons for Refusal issued Jul. 9, 2024 in the JP Patent Application No. 2023-017502.

* cited by examiner

*Primary Examiner* — Courtney D Thomas
(74) *Attorney, Agent, or Firm* — CKC & Partners Co., LLC

(57) ABSTRACT

A cell assembly for structural observation is provided which can allow X rays to effectively penetrate a cell which is the observation target in a relative wide range, and appropriately handle expansion/contraction of the cell itself. A cell assembly for structural observation for observing an internal structure of a cell by X-ray CT includes: a pair of restraining members (a first restraining member and a second restraining member) which restrain the cell serving as the observation target by sandwiching from both sides thereof, and in which one of the restraining members (the first restraining member) among the pair of restraining members has an X-ray irradiated part of relatively thinner thickness than the other restraining member (the second restraining member) formed at a site corresponding to the cell. In this mode, a displacement detection region is established in the X-ray irradiated part.

6 Claims, 2 Drawing Sheets

CELL ASSEMBLY FOR ELECTRODE STRUCTURAL OBSERVATION

This application is based on and claims the benefit of priority from Japanese Patent Application No. 2023-017502, filed on 8 Feb. 2023, the content of which is incorporated herein by reference.

BACKGROUND OF THE INVENTION

Field of the Invention

The present invention relates to a cell assembly for electrode structural observation.

Related Art

A cell which is a constituent element of a secondary battery module is accompanied by expansion and contraction during charging and discharging. For this reason, the electrodes are often used in a state restrained from the thickness direction. A technique for observing the electrode structure in a state imitating such a usage state has been proposed. For example, it is a technique which observes an electrode cross section by SEM (scanning microscope) or a confocal optical system in a state restraining the electrode by a restraining member from the thickness direction. With these techniques, in the case of being an electrode having a great expansion/contraction amount, it is difficult to completely suppress the expansion of the electrode to the projecting direction from the machined cross section for observation. For this reason, there is concern over the observation result differing from the behavior of the structure during actual use. On the other hand, although the above concern is eliminated if observing by X-ray CT, for which the machining of a cross section for observation is unnecessary, the image quality of X-ray CT images declines by X-ray absorption in the restraining member restraining the electrode from the thickness direction. The decline in image quality becomes an obstacle to making detailed observation.

As the cell assembly for electrode structural observation for performing observation by X-ray CT on this cell, in a state restraining the cell of a secondary battery from the thickness direction by a restraining member, it has been proposed to adopt an assembly made using a disk-shaped restraining member providing with a hole in the center for passing through X rays (for example, refer to Patent Document 1). In addition, in a measurement system performing analysis by irradiating X-rays onto a measured member in a flow cell, it is proposed to perform irradiation of X-rays from a thin-wall part established in the flow cell (for example, refer to Patent Document 2).

Patent Document 1: Japanese Unexamined Patent Application, Publication No. 2012-159311

Patent Document 2: Japanese Unexamined Patent Application, Publication No. 2019-045295

SUMMARY OF THE INVENTION

With the cell assembly for electrode structural observation of Patent Document 1, for the hole passing X rays therethrough provided at the center of the disk-shaped member, which is the restraining member, a hole in a condition providing a tapered surface which expands in diameter to outwards at the inner circumferential edge thereof has been disclosed. It is said to be possible to introduce X-rays from a wide angle range to the cell, which is the observation target. However, the region through which X-rays can be effectively passed is limited to the locations of the hole in the center of the restraining member, and cannot restrain the cell at the location of the hole. On the other hand, with the measurement system of Patent Document 2, there is no concern over cases where the measured member has a property of expanding and contracting depending on the conditions.

The present invention has been made taking account of the above situation, and has an object of providing a cell assembly for electrode structural observation which can effectively pass X-rays in a relatively wide range on the cell which is the observation target, and appropriately deal with expansion/contraction of the cell itself.

A cell assembly for structural observation for observing an internal structure of a cell by X-ray CT according to a first aspect of the present invention includes: a pair of restraining members which restrain the cell serving as an observation target by sandwiching from both sides thereof, in which one of the restraining members among the pair of the restraining members has an X-ray irradiated part which is relatively thinner than another of the restraining members formed at a site corresponding to the cell.

According to a second aspect of the present invention, in the cell assembly for structural observation as described in the first aspect, a displacement detection region is established in the X-ray irradiated part.

According to a third aspect of the present invention, in the cell assembly for structural observation as described in the first or second aspect, the cell assembly for structural observation is supported by a rotation support member which rotatably supports the cell assembly for structural observation.

According to a fourth aspect of the present invention, in the cell assembly for structural observation as described in the third aspect, two fastening members for fastening between a pair of the main restraining members are provided, the two of the fastening members being disposed to sandwich an electrode opposing part, which is an observation target site of the cell, in a rotation axis direction of rotation of the cell assembly for structural observation by way of the rotation support member.

According to a fifth aspect of the present invention, in the cell assembly for structural observation as described in the third or fourth aspect, a positive electrode terminal and a negative electrode terminal drawn out from the cell are disposed to sandwich an electrode opposing part which is an observation target site of the cell, in a rotation axis direction of rotation of the structural observation cell assembly by way of the rotation support member.

According to a sixth aspect of the present invention, in the cell assembly for structural observation as described in the fifth aspect, a positive electrode busbar housing and a negative electrode busbar housing are respectively provided so as to house a positive electrode busbar connected to the positive electrode terminal and a negative electrode busbar connected to the negative electrode terminal, and the positive electrode busbar housing and the negative electrode busbar housing are disposed to sandwich the electrode opposing part which is an observation target site of the cell, in a rotation axis direction of rotation of the cell assembly for structural observation by way of the rotation support member.

With the cell assembly for structural observation according to the first aspect, since X-ray irradiation on the cell is possible in a relative wide range from the X-ray irradiated part provided in one restraining member and of a relatively thinner thickness than the other restraining member, it is possible to perform accurate structural observation. In addition, strain of the restraining members due to expansion of the cell is remarkably ubiquitous on the side of one restraining member having a portion of relatively thin thickness. For this reason, the extent of expansion of the cell is detectable exclusively on the side of the one restraining member.

With the cell assembly for structural observation according to the second embodiment, since it is possible to detect a value corresponding to the expansion of the cell at the displacement detection region of one restraining member at which strain of the restraining member due to expansion of the cell is remarkably ubiquitous, it is possible to easily obtain high precision information of the state of the cell.

With the cell assembly for structural observation according to the third aspect, it is possible to observe the cell which is the observation target from various angles.

With the cell assembly for structural observation according to the fourth aspect, the fastening members are separated from the electrode opposing part which is the observation target site of the cell, and thus will not affect observation by X-ray CT.

With the cell assembly for structural observation according to the fifth aspect, since the positive electrode terminal and negative electrode terminal are separated from the electrode opposing part which is the observation target site of the cell, operations on the positive electrode terminal and negative electrode terminal will not affect observation by X-ray CT.

With the cell assembly for structural observation according to the sixth aspect, since the positive electrode busbar housing and negative electrode busbar housing are separated from the electrode opposing part which is the observation target site of the cell, operations on the positive electrode busbar and negative electrode busbar will not affect observation by X-ray CT.

DETAILED DESCRIPTION OF THE INVENTION

Figure 1:
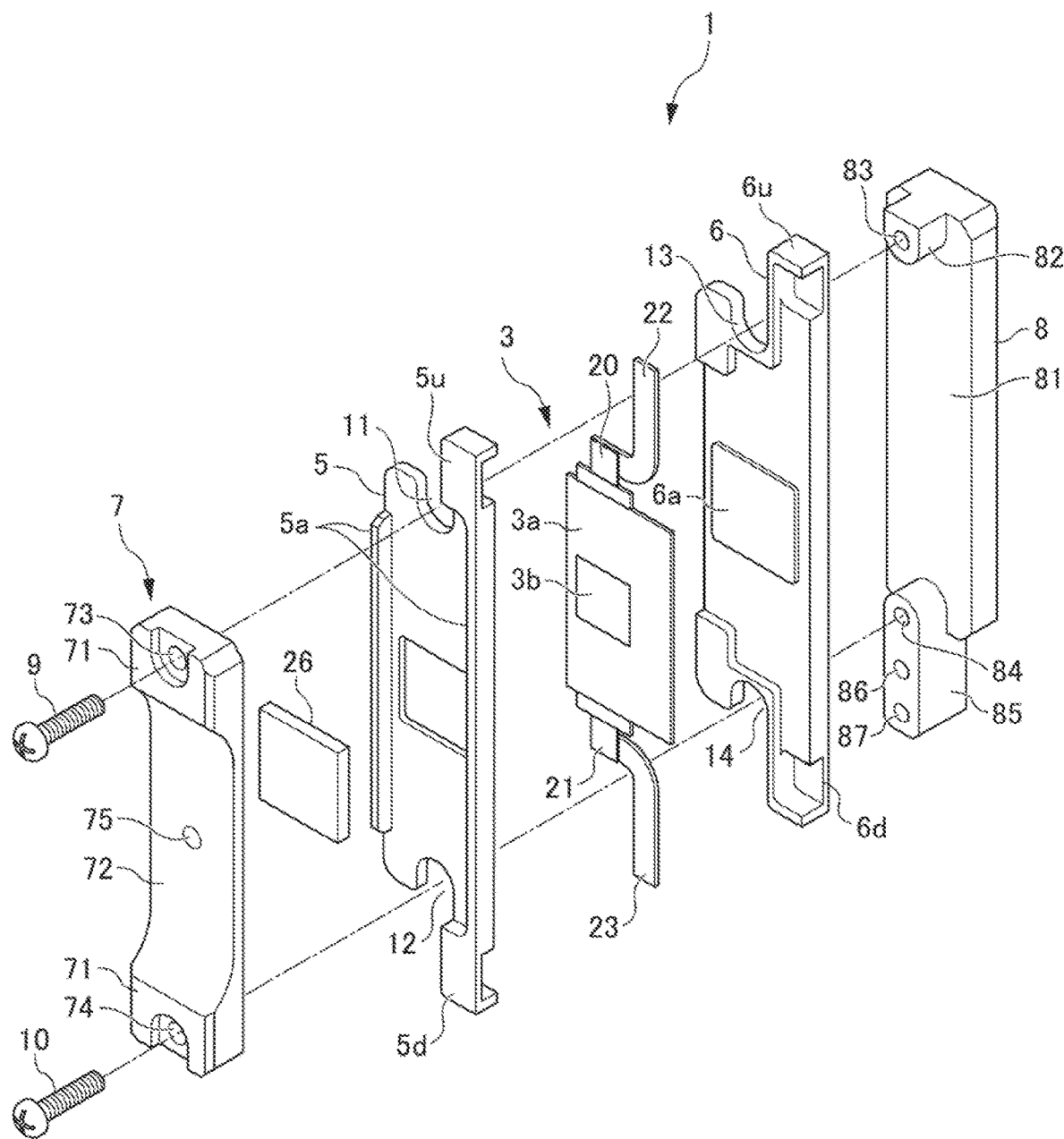
FIG. 1 is an exploded perspective view showing a cell assembly for structural observation of the present disclosure.
Figure 2:
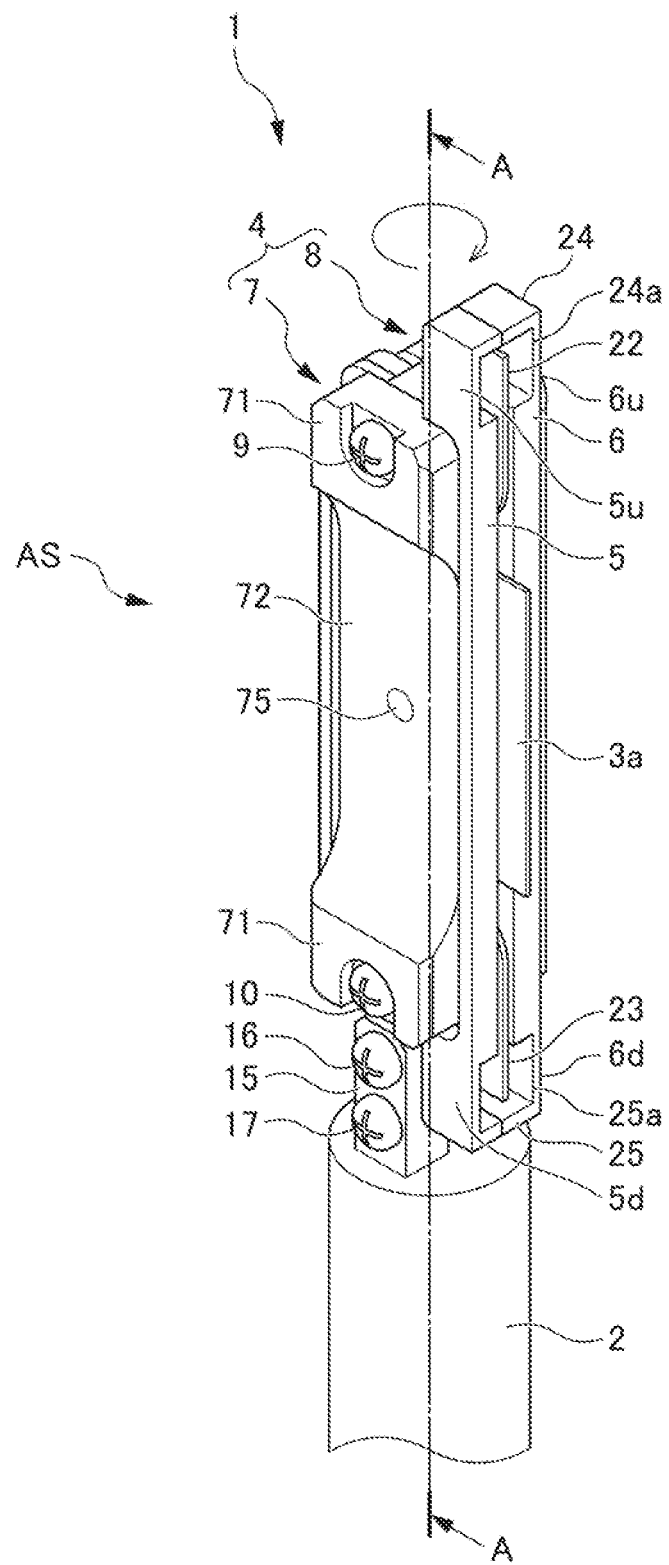
FIG. 2 is a perspective view of the cell assembly for structural observation in FIG. 1.

FIG. 1 is an exploded perspective view showing a cell assembly 1 for structural observation of the present disclosure. FIG. 2 is a perspective view of the cell assembly 1 for structural observation. In detail, FIG. 1 shows a portion of the cell assembly 1 for structural observation excluding a rotation support member 2 described later. It should be noted that the up/down direction in the following explanation is a direction viewed in the drawing, for example, is a vertical direction; however, it is not the purpose to limited to this.

The cell assembly 1 for structural observation is an assembly for observing the internal structure of a cell which is a constituent element of a secondary battery module by X-ray CT (not shown). The cell assembly 1 for structural observation includes: a pair of restraining members 4, which are rigid bodies sandwiching a flat cell 3 serving as the observation target from both sides thereof to restrain; and a first insulation member 5 and second insulation member 6 respectively interposed between the pair of main restraining members 4 and cell 3.

The pair of restraining members 4 sandwiches the cell 3 to restrain by the first restraining member 7 positioned on one lateral side of the cell 3, and the second restraining member 8 positioned on the other lateral side of the cell 3. Upon this sandwiching, a plate-like first insulation member 5 whose principal surface is substantially rectangular is interposed between the first restraining member 7 and one side of the cell 3, and a plate-like second insulation member 6 whose principal surface is substantially rectangular is interposed between the second restraining member 8 and the other side of the cell 3. In the first insulation restraining member 5, position regulating parts 5a, 5a standing up in the thickness direction from both side edges are formed. The relative positions between the first insulation restraining member 5 and first main restraining member 7 are restricted by these position regulating parts 5a, 5a. For the second insulation restraining member 6, a position regulating means similar to the first insulation member 5 is taken.

The first restraining member 7 forms thick-wall parts 71, 71 in which both upper and lower end sides have a relatively thick dimension, and between both thick-wall parts 71, 71 exhibits a shape having a thin-wall part 72 having a relatively small thickness dimension. The X-rays of X-ray CT (not shown) are irradiated from outside toward the thin-wall part 72, and pass through the thin-wall part 72 to reach the cell 3. In other words, the thin-wall part 72 is an X-ray irradiated part. On the other hand, in the second restraining member 8, the opposing surface 81 to the cell 3 is a flat surface, and the entire surface of the opposing surface 81 is in surface contact with the second insulation member 6.

An upper bolt insertion hole 73 is formed so as to pierce the upper end vicinity of the upper thick-wall part 71 of the first restraining member 7 in the thickness direction, and a lower bolt insertion hole 74 is formed so as to pierce a lower end vicinity of the lower thick-wall part 71 in the thickness direction. On the other hand, an upper female thread hole 83 corresponding to the upper bolt insertion hole 73 on the side of the first restraining member 7 is formed in the vicinity of the upper end of the second restraining member 8, at a projecting part 82 projecting from the opposing surface 81 to the side of the first restraining member 7. In addition, the lower female thread hole 84 corresponding to the lower bolt insertion hole 74 on the side of the first restraining member 7 is formed in the vicinity of the lower end of the second restraining member 8.

The first main restraining member 7 and second main restraining member 8 are fastened with the appropriate fastening force by an upper bolt 9 and a lower bolt 10 sandwiching the cell 3 via a first auxiliary restraining member 5 and the second auxiliary restraining member 6. The cell 3 is thereby restrained from both sides. Upon this fastening, the bolt 9 inserted from the upper bolt insertion hole 73 is threaded to the upper female thread hole 83, and the holt 10 inserted from the lower bolt insertion hole 74 is threaded to the lower female thread hole 84.

In order to insert the bolt 9 and bolt 10 without problems from the first restraining member 7 to the second restraining member 8, the following such configuration is adopted. In other words, a recess 11 to avoid interference with the bolt 9 is provided in the vicinity of the upper end of the first insulation member 5, and a recess 12 to avoid interference with the bolt 10 is provided in the vicinity of the lower end of the first insulation member 5. In addition, a recess 13 to avoid interference with the bolt 9 is formed in the vicinity of the upper end of the second insulation member 6, and a recess 14 to avoid interference with the bolt 10 is formed in the vicinity of the lower end of the second insulation member 6. It is possible to insert the bolt 9 from the upper bolt insertion hole 73 to the upper female thread hole 83 without interfering with the first insulation member 5 and second insulation member 6, by way of the recess 11 and recess 13. Similarly, it is possible to insert the bolt 10 from the lower bolt insertion hole 74 to the lower female thread hole 84 without interfering with the first insulation member 5 and second insulation member 6, by way of the recess 12 and recess 14.

A projecting member 85 is provided so as to project from a short-side central site in the vicinity of the lower end of the second restraining member 8 to downwards. The projecting member 85 is a member of roughly columnar shape having a larger dimension in the insertion direction of the lower bolt 10 than the thickness dimension of the second restraining member 8, and a width dimension in a direction orthogonal to the insertion direction narrower than the width of the lower end of the second restraining member 8. The aforementioned lower female thread hole 84 is provided on the upper side of the projecting member 85. On a surface of the projecting member 85 at which the lower female thread hole 84 is open, assembly mounting female thread holes 86 and 87 are provided in parallel downwards from the lower female thread hole 84. In other words, on the same side of the projecting member 85, the lower female thread hole 84, and assembly mounting female thread holes 86 and 87 are provided in parallel in the above order from above to below.

An assembly AS including a pair of restraining members 4 retraining the cell 3 serving as the observation target by sandwiching from both sides, and the first insulation member 5 and second insulation member 6 interposed when sandwiching the cell 3 by the restraining member 4 is mounted on the upper end side of a cylindrical rotation support member 2 extending in the vertical direction. In this mounting, a short prism-like mounting member 15 provided to project upwards to the upper end of the rotation support member 2 can be used.

In other words, each leading end side of the two assembly mounting bolts 16, 17 inserted from the mounting member 15 are threaded into the assembly mounting female thread holes 86, 87 provided in the projecting member 85 of the second restraining member 8, and the assembly AS is mounted to the rotation support member 2. The rotation support member 2 rotates by a rotary drive mechanism (not shown), whereby the assembly AS turns. One mode of the cell assembly 1 for structural observation of the present disclosure is configured to include the assembly AS and rotation support member 2.

Herein, in the cell 3, an electrode opposing part 3b, which is a portion at which the separator sheet is opposing the positive electrode active material layer and negative electrode active material layer inside of the central part of the cell body 3a is defined as the observation target site. A positive electrode terminal 20 is led out at the upper edge of the cell body 3a, and a negative electrode terminal 21 is led out at the lower edge of the cell body 3a. A positive electrode busbar 22 is led out from the positive electrode terminal 20, and a negative electrode busbar 23 is led out from the negative electrode terminal 21. The positive electrode terminal 20 and negative electrode terminal 21 are thereby positioned to be distanced from the penetrating site of X-rays of the electrode opposing part 3b, which is the observation target site, in the rotation axis direction of rotation of the assembly AS. For this reason, the positive electrode terminal 20 and negative electrode terminal 21 do not influence observation by X-ray CT. In addition, the aforementioned bolt 9 and bolt 10, as well as the upper female thread hole 83 and lower female thread hole 84 are positioned to be distanced from the penetrating site of X-rays of the electrode opposing part 3b, which is the observation target site, in the rotation axis direction of rotation of the assembly AS. In other words, the site fastened by the bolt 9 and bolt 10, as well as the upper female thread hole 83 and lower female thread hole 84 forms two fastening members, which are a set of a bolt and female thread fastening the first restraining member 7 and second restraining member 8, which are the main restraining members 4, and these two fastening members are arranged to sandwich the electrode opposing part 3b, which is the observation target site of the cell 3, in the rotation axis direction of rotation of the assembly AS by the rotation support member 2. For this reason, the bolt 9 and bolt 10, as well as the upper female thread hole 83 and lower female thread hole 84 do not affect observation by X-ray CT.

As in FIG. 1, the positive electrode busbar 22 extends shortly in parallel to the upper edge of the cell body 3a from the connection with the positive electrode terminal 20, bends vertically upwards without reaching the lateral edge of the cell body 3a, and extends upwards by a predetermined dimension to exhibit a form reaching its upper end. In addition, the negative electrode busbar 23 extends shortly in parallel to the lower edge of the cell body 3a from the connection with the negative electrode terminal 21, bends vertically downwards without reaching the lateral edge of the cell body 3a, and extends downwards by a predetermined dimension to exhibit a form reaching its lower end.

A positive electrode busbar housing 24 is formed by the positive electrode busbar housing half 5u formed to project upwards at the upper edge of the first insulation member 5, and a positive electrode busbar housing half 6u formed to project upwards at the upper edge of the second insulation member 6 being matched so that both housing recesses are facing. The upper end proximity part of the positive electrode busbar 22 is accommodated in the positive electrode busbar housing 24. As in FIG. 2, the positive electrode busbar housing 24 has a window 24a that is open to one side of the assembly AS to allow an electrical I/O operation from outside on the positive electrode busbar 22 inside.

A negative electrode busbar housing 25 is formed by a negative electrode busbar housing half 5d formed to project downwards at the lower edge of the first insulation member 5, and a negative electrode busbar housing half 6d formed to project downwards at a lower edge of the second insulation member 6 being matched so that both housing recesses face each other. A lower end proximity part of the negative electrode busbar 23 is accommodated in the negative electrode busbar housing 25. As in FIG. 2, the negative electrode busbar housing 25 has a window 25a that is open to one side of the assembly AS to allow an electrical I/O operation from outside on the negative electrode busbar 23 inside.

The aforementioned window 24a and window 25a are both positioned to be respectively distanced from the penetrating site of X-rays of the electrode opposing part 3b, which is the observation target site. When changing the perspective, the positive electrode terminal 20 and negative electrode terminal 21 leading out from the cell 3 are arranged to sandwich the electrode opposing part 3b, which is the observation target site of the cell 3, in the rotation axis direction of rotation of the assembly AS by the rotation support member 2. In addition, the positive electrode busbar housing 24 and negative electrode busbar housing 25 are provided so as to respectively accommodate the positive electrode busbar 22 connected to the positive electrode terminal 20 and the negative electrode busbar 23 connected to the negative electrode terminal 21, and the positive electrode busbar housing 24 and negative electrode busbar housing 25 are arranged to sandwich the electrode opposing part 3b, which is the observation target site of the cell 3, in the rotation axis direction of rotation of the assembly AS by the rotation support member 2. Upon performing operation of electrical I/O from the window 24A and window 25a of the positive electrode busbar housing 24 and negative electrode busbar housing 25 and performing observation by changing the SOC of the cell 3, this operation will not affect observation by X-ray CT.

As mentioned above, the first insulation member 5 interposes between the cell 3 and the first restraining member 7, which is one member among the pair of restraining members 4 restraining the cell 3 by sandwiching from both sides thereof; however, in more detail, an opening 5b corresponding to the external form of the electrode opposing part 3b of the cell 3 is provided at the center of the first insulation member 5, and the first restraining member 7 and electrode opposing part 3b abut via a square plate-shaped spacer 26 arranged within the opening 5b. In addition, the second insulation member 6 interposes between the cell 3 and the second restraining member 8, which is the other member among the pair of restraining member 4; however, in more detail, a convex part 6a formed in the second insulation member 6 abuts the electrode opposing part 3b so as to oppose the other surface of the electrode opposing part 3b.

Since the cell assembly 1 for structural observation of the present disclosure has the aforementioned configuration, the restraining force from the first restraining member 7 and second restraining member 8, which are the pair of restraining members 4, to the cell 3 serving as the observation target extends as follows. The tension acting on both bolts 9, 10 by fastening the bolt 9 and bolt 10 generates force on the opposing first restraining member 7 and second restraining member 8 in a direction narrowing the gap of both.

As a result thereof, the pressure towards one surface of the cell 3 from the first restraining member 7 transmits via the spacer 26 arranged within the opening 5b of the first insulation member 5, and pushes and restrains the one surface of the electrode opposing part 3b of the cell 3 in the normal vector direction thereof. Simultaneously, the pressure towards the other surface of the cell 3 from the opposing surface 81 to the cell 3 of the second restraining member 8 transmits via the convex part 6a of the second insulation member 6, and pushes and restrains the other surface of the electrode opposing part 3b of the cell 3 in the normal vector direction thereof.

In the cell assembly 1 for structural observation of the present disclosure, the thin-wall part 72 is formed between both thick-wall parts 71, 71 on both upper and lower end sides of the first restraining member 7. The thin-wall part 72 is an X-ray irradiated part on which X-rays are irradiated from the X-ray CT (not shown). Since the X-ray irradiated part is thin, the loss upon X-rays passing therethrough is small. For this reason, upon structural observation of the cell 3 defined as the observation target installed to the assembly AS, the X rays can be irradiated and penetrate the cell 3 effectively for various pivot angles by rotation of the rotation support member 2 to collect accurate data.

However, among the pair of restraining members 4, the thin-wall part 72 is provided only to a side of the first restraining member 7, which is one restraining member, and the entirety on the side of the second restraining member 8 which is the other restraining member is a thick-walled member. For this reason, the strain (displacement amount) of the pair of restraining members 4 caused by stress generated by expansion of the cell 3 appears ubiquitously on the side of the first restraining member 7.

With the cell assembly 1 for structural observation of the present disclosure, a displacement detection region 75 is established at the central part of the first restraining member 7. If pasting a strain gauge on the displacement detection region 75, it is possible to obtain data related to the expansion amount of the cell 3 as a detection value from this strain gauge. Based on the data related to the expansion amount of the cell 3, it is possible to calculate the volume change of active material in the cell 3.

In the case of being performed using a strain gauge pasted to the displacement detection region 75 of the first restraining member 7, since it is possible to acquire data corresponding to the expansion amount of the cell 3 from a single location, it is possible to reduce the degree to which the detection means for strain (displacement) interferes with pivoting of the assembly AS. It should be noted that, even if measuring the displacement in the normal direction of the displacement detection region 75 by a laser displacement meter instead of pasting the strain gauge, it is possible to obtain similar data corresponding to the expansion amount of the cell 3.

According to the cell assembly 1 for structural observation of the present disclosure, the following effects are exerted.

(1) With the cell assembly 1 for structural observation, since X-ray irradiation is possible in a relative wire range of angle of incidence on the cell 3 from the X-ray irradiated part 72 provided to the first restraining member 7, which is one restraining member of the pair of restraining members 4, and established in the thin-wall part 72 having a relative thinner thickness than the second restraining member 8, which is the other restraining member, it is possible to perform accurate structural observation relying on abundant observation data. In addition, strain of the pair of restraining members 4 due to expansion of the cell 3 is remarkably ubiquitous on the side of the first restraining member 7 having a portion of relatively thin thickness. For this reason, the extent of expansion of the cell 3 is detectable exclusively on the side of the first restraining member 7, which is one restraining member.

(2) With the cell assembly 1 for structural observation, since it is possible to detect a value corresponding to the expansion of the cell 3 at the displacement detection region 75 of the thin-wall part (X-ray irradiated part) 72 on the side of the first restraining member 7 at which strain of the restraining member due to expansion of the cell 3 is remarkably ubiquitous, it is possible to easily obtain high precision information of the state of the cell 3.

(3) With the cell assembly for structural observation, it is possible to observe the cell which is the observation target from various angles.

(4) In the cell assembly 1 for structural observation, a fastening member (set of the bolt 9 and upper female thread hole 83, set of the bolt 10 and lower female thread hole 84) are separated from the electrode opposing part 3b which is the observation target site of the cell 3, and does not affect observation by X-ray CT.

(5) In the cell assembly for structural observation, since the positive electrode terminal 20 and negative electrode terminal 21 are separated from the electrode opposing part 3b which is the observation target site of the cell 3, operations on the positive electrode terminal 20 and negative electrode terminal 21 will not affect observation by X-ray CT.

(6) With the cell assembly for structural observation, since the positive electrode busbar housing 24 and negative electrode busbar housing 25 are separated from the electrode opposing part 3b which is the observation target site of the cell 3, operations on the positive electrode busbar 22 and negative electrode busbar 23 will not affect observation by X-ray CT.

EXPLANATION OF REFERENCE NUMERALS

AS assembly
1 cell assembly for structural observation
2 rotation support member
3 cell
3a cell body
3b electrode opposing part
4 restraining member
5 first insulation member
5d negative electrode busbar housing half
5u positive electrode busbar housing half
6 second insulation member
6a convex part
6d negative electrode busbar housing half
6u positive electrode busbar housing half
7 first restraining member
8 second restraining member
9, 10 bolt
11, 12, 13, 14 recess
15 mounting member
16, 17 assembly mounting bolt
20 positive electrode terminal
21 negative electrode terminal
22 positive electrode busbar
23 negative electrode busbar
24 positive electrode busbar housing
24a window
25 negative electrode busbar housing
25a window
26 spacer
71 thick-wall part
72 thin-wall part (X-ray irradiated part)
73 upper bolt insertion hole
74 lower bolt insertion hole
75 displacement detection region
81 opposing surface
82 projecting part
83 upper female thread hole
84 lower female thread hole
85 projecting member
86, 87 assembly mounting female thread hole

What is claimed is:

1. A cell assembly structural for observation for observing an internal structure of a cell by X-ray CT, the cell assembly comprising:
   a pair of restraining members which restrain the cell serving as an observation target by sandwiching from both sides thereof,
   wherein one of the restraining members among the pair of the restraining members has an X-ray irradiated part which is relatively thinner than another of the restraining members formed at a site corresponding to the cell.

2. The cell assembly for structural observation according to claim 1, wherein a displacement detection region is established in the X-ray irradiated part.

3. The cell assembly for structural observation according to claim 1, wherein the cell assembly for structural observation is supported by a rotation support member which rotatably supports the cell assembly for structural observation.

4. The cell assembly for structural observation according to claim 3, wherein two fastening members for fastening between a pair of the main restraining members are provided, the two of the fastening members being disposed to sandwich an electrode opposing part, which is an observation target site of the cell, in a rotation axis direction of rotation of the cell assembly for structural observation by way of the rotation support member.

5. The cell assembly for structural observation according to claim 3, wherein a positive electrode terminal and a negative electrode terminal drawn out from the cell are disposed to sandwich an electrode opposing part which is an observation target site of the cell, in a rotation axis direction of rotation of the structural observation cell assembly by way of the rotation support member.

6. The cell assembly for structural observation according to claim 5, wherein a positive electrode busbar housing and a negative electrode busbar housing are respectively provided so as to house a positive electrode busbar connected to the positive electrode terminal and a negative electrode busbar connected to the negative electrode terminal, and the positive electrode busbar housing and the negative electrode busbar housing are disposed to sandwich the electrode opposing part which is an observation target site of the cell, in a rotation axis direction of rotation of the cell assembly for structural observation by way of the rotation support member.

* * * * *